US007423991B2

(12) United States Patent
Cho et al.

(10) Patent No.: US 7,423,991 B2
(45) Date of Patent: Sep. 9, 2008

(54) APPARATUS AND METHOD FOR ALLOCATING SUBCHANNELS ADAPTIVELY ACCORDING TO FREQUENCY REUSE RATES IN AN ORTHOGONAL FREQUENCY DIVISION MULTIPLE ACCESS SYSTEM

(75) Inventors: Sung-Hyun Cho, Seoul (KR); Sang-Boh Yun, Seongnam-si (KR); Won-Hyoung Park, Seoul (KR); Young-Nam Han, Daejeon (KR); Hoon Kim, Seoul (KR); Ja-Yong Koo, Seoul (KR)

(73) Assignees: Samsung Electronics Co., Ltd (KR); Seoul National University Industry Foundation (KR)

( * ) Notice: Subject to any disclaimer, the term of this patent is extended or adjusted under 35 U.S.C. 154(b) by 545 days.

(21) Appl. No.: 11/020,414

(22) Filed: Dec. 23, 2004

(65) Prior Publication Data
US 2005/0169229 A1 Aug. 4, 2005

(30) Foreign Application Priority Data
Dec. 23, 2003 (KR) ...................... 10-2003-0095455

(51) Int. Cl.
*H04Q 7/00* (2006.01)
*H04Q 7/20* (2006.01)
(52) U.S. Cl. ........................ 370/329; 370/344; 370/437; 370/462; 455/450; 455/452.1; 455/452.2; 455/447
(58) Field of Classification Search ...... 455/450–452.2, 455/447; 370/329, 330, 431, 441
See application file for complete search history.

(56) References Cited

U.S. PATENT DOCUMENTS

| 6,141,393 | A  | * | 10/2000 | Thomas et al. ............... 375/347 |
| 6,522,885 | B1 | * | 2/2003 | Tang et al. ................... 455/447 |
| 6,765,969 | B1 | * | 7/2004 | Vook et al. ................... 375/259 |
| 6,985,432 | B1 | * | 1/2006 | Hadad ......................... 370/203 |
| 2004/0127223 | A1 | * | 7/2004 | Li et al. ....................... 455/446 |
| 2005/0195909 | A1 | * | 9/2005 | Hwang et al. ................ 375/260 |

OTHER PUBLICATIONS

H. Kim, Y. Han, J. Koo, "Optimal Subchannel Allocation Scheme in Multicell OFDMA System", Vechicular Technology Conference, 2004. IEEE 59th vol. 3, May 17-19, 2004, pp. 1821-1825.*

* cited by examiner

*Primary Examiner*—Rafael Pérez-Gutiérrez
*Assistant Examiner*—Allahyar Kasraian
(74) *Attorney, Agent, or Firm*—The Farrell Law Firm, PC

(57) ABSTRACT

An apparatus and method for adaptively allocating subchannels according to frequency reuse rates in an OFDMA system are provided. To allocate one or more subchannels to one or more MSs, information related to an optimum FRF and a modulation scheme is received from the plurality of MSs, the number of subchannels required for each FRF is calculated according to the received information, subchannels are allocated to the BS for each FRF, based on the calculated subchannel numbers from the BS and neighboring BSs, and the allocated subchannels are allocated to the MSs.

16 Claims, 11 Drawing Sheets

US 7,423,991 B2

APPARATUS AND METHOD FOR ALLOCATING SUBCHANNELS ADAPTIVELY ACCORDING TO FREQUENCY REUSE RATES IN AN ORTHOGONAL FREQUENCY DIVISION MULTIPLE ACCESS SYSTEM

PRIORITY

This application claims priority under 35 U.S.C. § 119 to an application entitled "Apparatus and Method for Allocating Subchannels Adaptively According to Frequency Reuse Rates in an Orthogonal Frequency Division Multiple Access System" filed in the Korean Intellectual Property Office on Dec. 23, 2003 and assigned Serial No. 2003-95455, the contents of which are incorporated herein by reference.

BACKGROUND OF THE INVENTION

1. Field of the Invention

The present invention relates generally to a mobile communication system, and in particular, to an apparatus and method for allocating subchannels to a plurality of mobile stations (MSs) in an orthogonal frequency division multiple access (OFDMA) mobile communication system.

2. Description of the Related Art

A third generation (3G) mobile communication system is evolving into a fourth generation (4G) mobile communication system. The 4G mobile communication system is currently under the standardization process for the purpose of providing an efficient interworking and an integrated service between a wired communication network and a wireless communication network beyond the simple wireless communication service that the previous-generation mobile communications systems provide.

A signal on a radio channel experiences multipath interference due to obstacles encountered between a transmitter and a receiver in the mobile communication system. The multipath radio channel is characterized by its maximum delay spread and signal transmission period. If the maximum delay spread is longer than the transmission period, there is no interference between successive signals and the channel is characterized as a frequency nonselective fading channel.

However, the use of a single carrier scheme for high-speed data transmission with a short symbol period leads to severe intersymbol interference (ISI). The resulting increased signal distortion increases the complexity of an equalizer at a receiver.

In this context, orthogonal frequency division multiplexing (OFDM) was proposed as a useful scheme for solving the equalization problem in the single carrier transmission scheme.

OFDM is a special case of multi-carrier modulation (MCM) in which a serial symbol sequence is converted to parallel symbol sequences and modulated to a plurality of mutually orthogonal subcarriers (or sub-carrier channels).

The first MCM systems appeared in the late 1950's for military high frequency (HF) radio communication, and OFDM with overlapping orthogonal sub-carriers was initially developed in the 1970's. In view of the orthogonal modulation between the multiple carriers, the OFDM has limitations in the actual implementation for the systems. In 1971, Weinstein, et. al. proposed an OFDM scheme that applies a DFT (Discrete Fourier Transform) to the parallel data transmission as an efficient modulation/demodulation process, which was a driving force behind the development of the OFDM. Also, the introduction of a guard interval and a cyclic prefix as the guard interval further mitigates many of the adverse effects of the multi-path propagation and the delay spread on the systems.

That is why OFDM has been widely exploited for digital data communications such as digital audio broadcasting (DAB), digital TV broadcasting, wireless local area network (WLAN), and wireless asynchronous transfer mode (WATM). Although the complexity of the hardware was an obstacle to the wide use of the OFDM, recent advances in digital signal processing technology including FFT (Fast Fourier Transform) and IFFT (Inverse Fast Fourier Transform) have enabled the OFDM to be more easily implemented.

OFDM, similar to FDM (Frequency Division Multiplexing), boasts of an optimum transmission efficiency in a high-speed data transmission because it transmits the data on subcarriers, maintaining an orthogonality among them. The optimum transmission efficiency is further attributed to a good frequency use efficiency and a robustness against the multi-path fading in the OFDM.

Overlapping frequency spectrums lead to an efficient frequency use and a robustness against frequency selective fading and multi-path fading. The OFDM reduces the effects of the ISI by using guard intervals, and enables the design of a simple equalizer hardware structure. Furthermore, since the OFDM is robust against impulse noise, it is increasingly popular in communication systems.

With reference to FIG. 1, the structure of a typical OFDM mobile communication system will be described.

FIG. 1 is a block diagram of the typical OFDM communication system. The OFDM communication system is composed of a transmitter 100 and a receiver 150.

Referring to FIG. 1, the transmitter 100 comprises an encoder 104, a symbol mapper 106, a serial-to-parallel converter (SPC) 108, a pilot symbol inserter 110, an IFFT 112, a parallel-to-serial converter (PSC) 114, a guard interval inserter 116, a digital-to-analog converter (DAC) 118, and a radio frequency (RF) processor 120.

Upon the generation of the user data bits and the control data bits to be transmitted, the data and control bits are provided to the encoder 104. The user data bits and control data bits are collectively referred to as "user data" 102. The encoder 104 encodes the user data 102 according to a predetermined coding method. The coding method can be, but is not limited to, turbo coding or convolutional coding with a predetermined coding rate. The symbol mapper 106 modulates the coded bits received from the encoder 104 according to a predetermined modulation scheme. The modulation scheme can be, but is not limited to, BPSK (Binary Phase Shift Keying), QPSK (Quadrature Phase Shift Keying), 16 QAM (16ary Quadrature Amplitude Modulation), or 64 QAM.

The SPC 108 converts the serial modulated symbol sequence received from the symbol mapper 106 to parallel symbol sequences. The pilot symbol inserter 110 inserts pilot symbols into the parallel modulated symbols. The IFFT 112 N-point IFFT-processes the signal received from the pilot symbol inserter 110.

The PSC 114 serializes the IFFT signal. The guard interval inserter 116 inserts a guard interval into the serial signal from the PSC 114. The guard interval is inserted in order to cancel the effect of the interference between an OFDM symbol transmitted for the previous OFDM symbol period and an OFDM symbol to be transmitted for the current OFDM symbol period. It was initially proposed that null data is inserted for a predetermined period as the guard interval. However, the transmission of null data as the guard interval increases decision error probability of a received OFDM symbol involving interference between subcarriers if the receiver incorrectly estimates the start of the OFDM symbol. Hence, the guard interval is inserted in the form of a cyclic prefix or a cyclic postfix. The cyclic prefix is a copy of predetermined last samples of a time-domain OFDM symbol, inserted into an effective OFDM symbol. The cyclic postfix is a copy of predetermined first samples of a time-domain OFDM symbol, inserted into an effective OFDM symbol.

The DAC 118 converts the output of the guard interval inserter 116 to an analog signal and outputs the converted signal to the RF processor 120. The RF processor 120, which includes a filter and front end units (not shown), RF-processes the analog signal to be transmitted over the air, and transmits the RF signal over the air through a transmit (Tx) antenna.

Now a description will be made of the receiver 150. The receiver 150 operates in the reverse order of the operation of the transmitter 100.

The receiver 150 comprises an RF processor 152, an analogue-to-digital (ADC) 154, a guard interval remover 156, an SPC 158, an FFT 160, a pilot symbol extractor 162, a channel estimator 164, an equalizer 166, a PSC 168, a symbol demapper 170, and a decoder 172.

A signal transmitted from the transmitter 100 experiences a multi-path channel and arrives at a receive (Rx) antenna as a signal having noise. The RF processor 152 downconverts the signal received from the Rx antenna to an intermediate frequency (IF) signal. The ADC 154 converts the analog IF signal to a digital signal.

The guard interval remover 156 removes a guard interval from the digital signal. The SPC 158 parallelizes the serial signal received from the guard interval remover 156 and the FFT 160 performs an N-point fast Fourier transformation on the parallel signals. The equalizer 166 channel-equalizes the FFT signal, and the PSC 168 serializes the equalized signal.

The pilot symbol extractor 162 detects pilot symbols from the FFT signal and the channel estimator 164 estimates a channel using the pilot symbols and provides the channel estimation result to the equalizer 166. The receiver 150 creates a CQI (Channel Quality Information) corresponding to the channel estimation result and transmits the CQI to the transmitter 100 through a CQI transmitter (not shown).

The symbol demapper 170 demodulates the serial signal received from the PSC 168 according to a predetermined demodulation method. The decoder 172 decodes the demapped symbols according to a predetermined decoding method and outputs the resulting final received user data 174. The demodulation and decoding methods are determined in correspondence with the modulation and coding methods used in the transmitter 100.

The OFDM system may use an OFDMA scheme to control multiple user accesses. The OFDMA scheme allows each user to use subsets of an OFDM subchannel through frequency hopping (FH) for spread spectrum. In OFDMA, a single user can transmit on a particular subchannel exclusively at any given time. In this environment, radio resources allocation is significant for optimization of system performance.

In the OFDM mode, an OFDM symbol is a basic unit for allocating resources. The number of bits of data that one OFDM symbol delivers is determined according to the modulation and coding scheme used as well as the number of data carriers per symbol. Meanwhile, the basic resources allocation unit is a subchannel in the OFDMA mode. Each OFDM symbol is transmitted on an integer number of subchannels according to the size of the FFT and the number of data bits per subchannel is equal to that of data carriers per subchannel.

It is well known that an OFDMA system is effectively implemented using channel status information. Conventionally, channel allocation is performed using signal to noise ratio (SNR) measured for a predetermined period based on radio channel status information. Or more simply, the best channel selected based on previous channel status information is first allocated.

To increase capacity using a given bandwidth in a multicell environment, a reuse partitioning method was proposed for a conventional FDMA system.

The reuse partitioning method is suited for the case where there are one modulation scheme, one service class, and one channel allocated per user. Therefore, it is not viable for the multicell environment of the OFDMA system in which adaptive modulation and coding (AMC) is used and users require various classes of data with different data rates. Moreover, a perfect dynamic channel allocation leads to complex implementation in view of cell coordination and channel estimation errors and increases performance degradation considerably.

SUMMARY OF THE INVENTION

The present invention pertains to an effective subchannel allocating method and apparatus in the above-described OFDM system which is incorporated into the physical architecture of the 4G wireless communication network.

An object of the present invention is to substantially solve at least the above problems and/or disadvantages and to provide at least the advantages below. Accordingly, an object of the present invention is to provide an apparatus and method for efficiently allocating subchannels to a plurality of MSs in an OFDMA mobile communication system.

Another object of the present invention is to provide an apparatus and method for adaptively allocating subchannels to a plurality of MSs according to a frequency reuse in an OFDMA mobile communication system.

A further object of the present invention is to provide an apparatus and method for allocating subchannels to a plurality of MSs with different frequency reuse rates for the subchannels used within a particular cell in an OFDMA mobile communication system.

The above objects are achieved by providing an apparatus and method for allocating subchannels adaptively according to frequency reuse rates in an OFDMA system.

According to one aspect of the present invention, in a method of allocating one or more subchannels to one or more MSs in an OFDMA mobile communication system in which a first BS communicates with a plurality of MSs within a cell area of the first BS and a radio network controller (RNC) controls radio resources for a plurality of BSs including the first BS, information on an optimum frequency reuse factors (FRF) and a modulation scheme is received from the plurality of MSs, the number of subchannels required for each FRF is calculated according to the received information, subchannels are allocated to the first BS for each FRF, taking into consideration the calculated subchannel numbers from the first BS and neighboring BSs, and the allocated subchannels are allocated to the MSs.

According to another aspect of the present invention, in an apparatus for allocating one or more subchannels to one or more MSs in an OFDMA mobile communication system in which a first BS communicates with a plurality of MSs within a cell area of the first BS and an RNC controls radio resources for a plurality of BSs including the first BS, a BS subchannel allocator receives from the plurality of MSs information on an optimum FRF and a modulation scheme, calculates the number of subchannels required for each FRF according to the received information, and allocates subchannels to the first BS for each FRF, taking into consideration the calculated subchannel numbers from the first BS and neighboring BSs. An MS subchannel allocator allocates the allocated subchannels to the MSs.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention is intended to provide an effective subchannel allocation method in an OFDM mobile communication system, especially in an OFDMA communication system that allocates subchannels to a plurality of users.

A plurality of subcarriers form one subchannel for a predetermined usage or for allocating to a particular MS. That is, one subchannel is composed of one or more subcarriers, and the subcarriers are allocated to MSs on a subchannel basis.

The present invention proposes a subchannel allocation method suitable for an OFDMA system that uses an Adatptive Modulation and Coding (AMC) scheme and provides various classes of services. The subchannel allocation method leads to efficient frequency reuse and increases system performance.

Meanwhile, the present invention uses different frequency reuse factors (FRFs) for subchannels within the same cell so that the subchannels are efficiently allocated according to the FRFs.

FRF is a parameter representing the frequency efficiency of a cellular system. It is defined as the number of cells for which the total available frequency band is divided. For example, if the total number of available channels is divided by 7 and a fraction of the total available frequency spectrum is allocated to each of 7 cells, then, the FRF is 7. A cluster of the 7 cells with different frequencies is called a cell cluster. Therefore, the FRF is the number of cells in the cell cluster.

For a CDMA system, the FRF is theoretically 1. In its actual implementation, it is 1/0.6. The FRF of CDMA is 4 times less than an analog scheme, AMPS (Advanced Mobile Phone Service) and 2 to 2.4 times less than TDMA (Time Division Multiple Access). Due to the FRF, the CDMA communication system has a greater channel capacity than other wireless access systems.

Frequency reuse techniques must be well utilized in order to increase the frequency resource use efficiency of a cellular system. As described before, frequency reuse is to use the same frequency used in a particular cell/sector for another cell/sector, and the frequency reuse rate is defined as the distance between cells/sectors using the same frequency.

In a system having an FRF of 1 (FRF 1), the SNR depends on the position of a receiving terminal. If the terminal is in a boundary area between cells/sectors or in a shadowing area, it experiences a very low SNR. On the other hand, if the terminal is near to a base station, it has a relatively high SNR.

Figure 1:
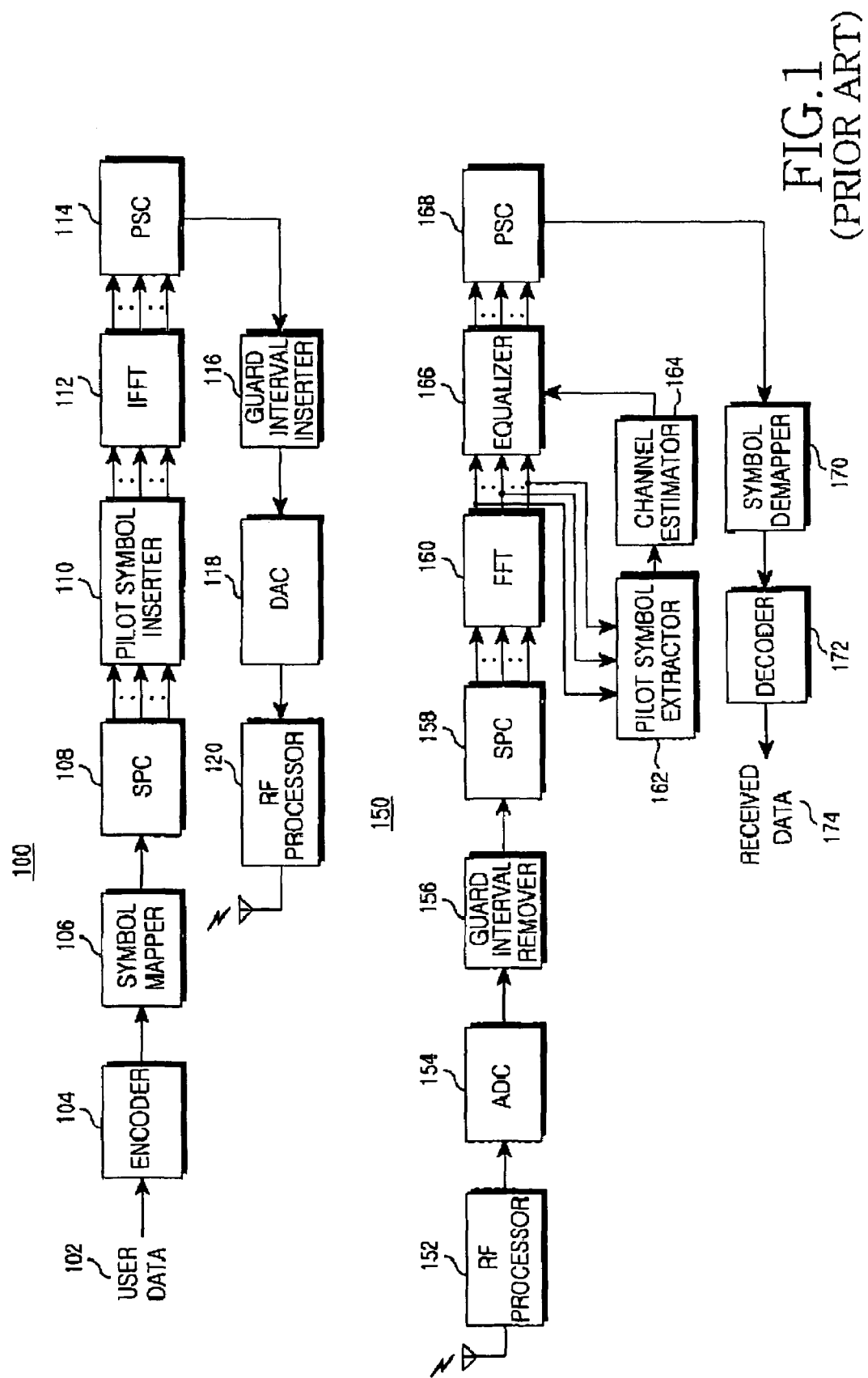
FIG. 1 is a block diagram of a transmitter and a receiver in a typical OFDM/OFDMA communication system.
Figure 2:
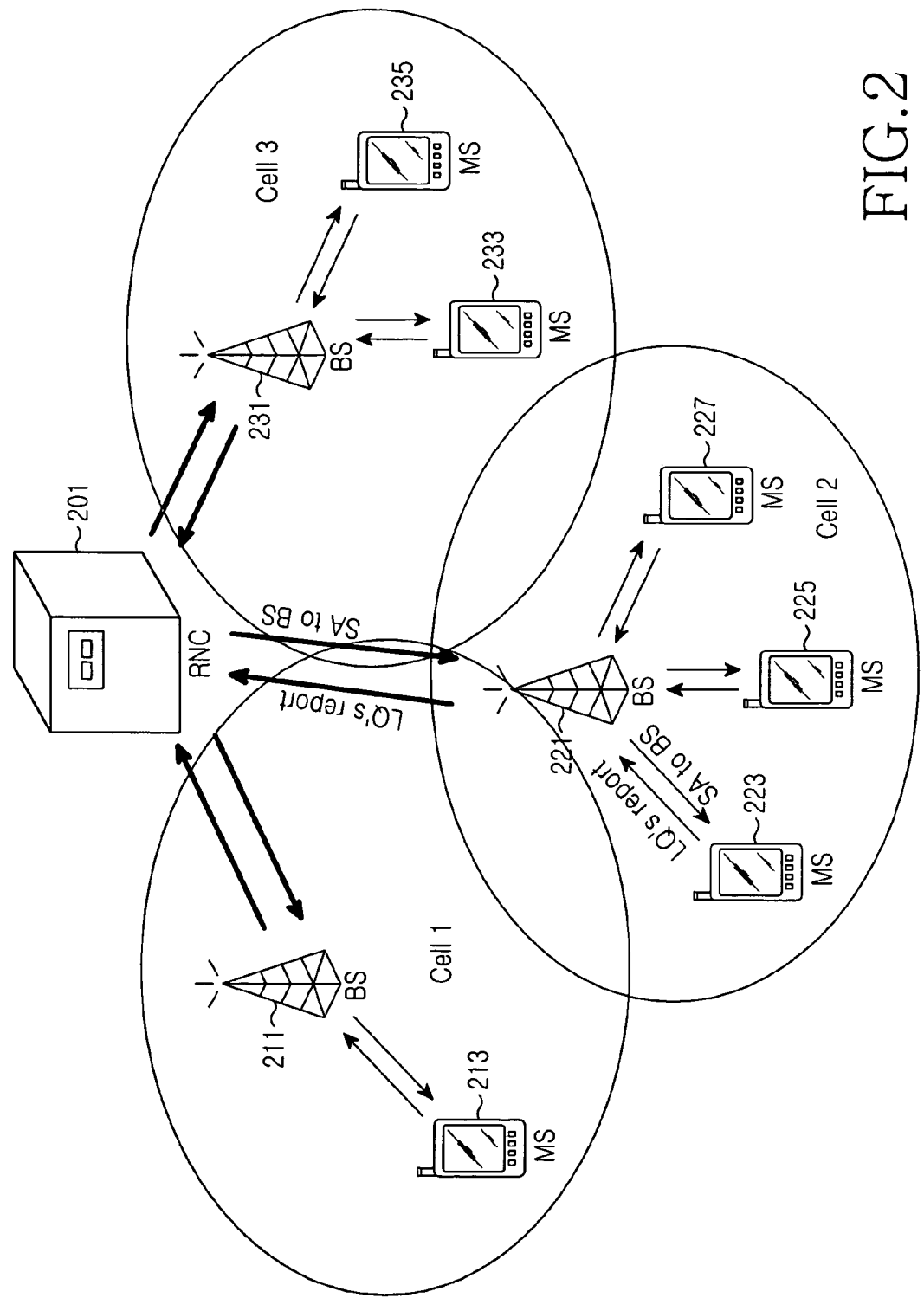
FIG. 2 illustrates the configuration of an OFDMA communication system according to an embodiment of the present invention.

FIG. 2 illustrates the configuration of an OFDMA system according to an embodiment of the present invention.

Referring to FIG. 2, the OFDMA system is composed of a plurality of MSs 213 223, 225, 227, 223 and 235, a plurality of BSs 211, 221 and 231 that communicate over the air, and an RNC 201 connected to the BSs 211, 221 and 231 by cable, for controlling them.

The MS 213 within cell 1 communicates with the BS 211 that controls cell 1, the MSs 223, 225 and 227 within cell 2 communicate with the BS 221 that controls cell 2, and the MSs 233 and 235 within cell 3 communicate with the BS 231 that controls cell 3. Meanwhile, the RNC 201 controls the BSs 211, 221 and 231 and performs radio resource allocation and data transmission/reception scheduling for them.

According to the present invention, each of the MSs 213 to 235 reports its link quality (LQ) to its serving BS. The BSs 211, 221 and 231 in turn report the LQs received from the MSs 213 to 235 to the RNC 201. The RNC 201 then collects the LQs, allocates radio resources (i.e. subchannels) to the BSs 211, 221 and 231 taking into consideration the LQs and requested resources of the BSs, and notifies the BSs of the allocated radio resources. Upon receipt of the radio resource allocation information, the BSs 211, 221 and 231 each allocate the radio resources efficiently to the MSs 213 to 235 within their cells.

The subchannel allocation to the BSs and then to the MSs according to the present invention will be described in more detail with reference to FIG. 3.

Figure 3:
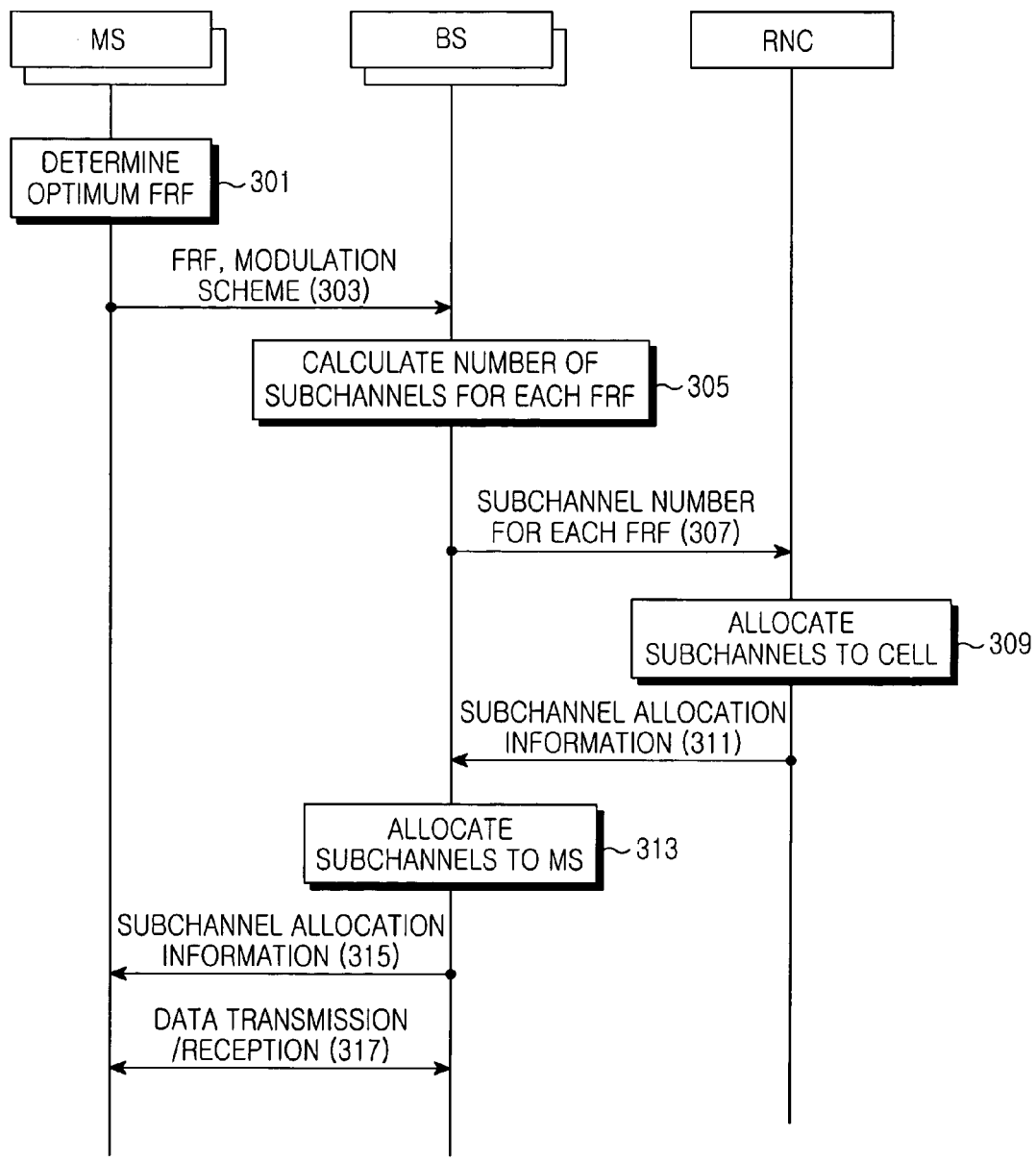
FIG. 3 is a diagram illustrating a signal flow for adaptive subchannel allocation based on a frequency reuse rate according to an embodiment of the present invention.

FIG. 3 is a diagram illustrating a signal flow for adaptively allocating subchannels according to a frequency reuse rate according to an embodiment of the present invention.

Referring to FIG. 3, an MS first calculates an optimal FRF according to its AMC information and channel status in step 301. In step 303, the MS reports the optimal FRF and a modulation scheme corresponding to the FRF to a BS. For example, if the available FRFs are 1, 3 and 7, the MS has the highest efficiency for FRF 1, and QPSK is available as a modulation scheme, the MS reports the FRF of 1 and QPSK to the BS.

Upon receipt of the information related to the FRF and the modulation scheme of each MS, the BS calculates the numbers of subchannels required for realizing each of the FRFs in step 305 and reports the calculations to an RNC in step 307. The RNC receives the number of subchannels for each FRF from each BS and allocates the total available subchannels to each BS (i.e. cell) in step 309.

The RNC transmits the information related to the subchannel allocation to each BS in step 311. The BS allocates the allocated subchannels to the MSs within its cell in step 313. The BS transmits the information related to the allocated subchannel to each of the MSs in step 315. The MS transmits and receives data over the allocated subchannel to and from the BS in step 317.

The subchannel allocation procedure illustrated in FIG. 3 will be described in further detail with reference to FIG. 4 through FIG. 7.

Figure 4:
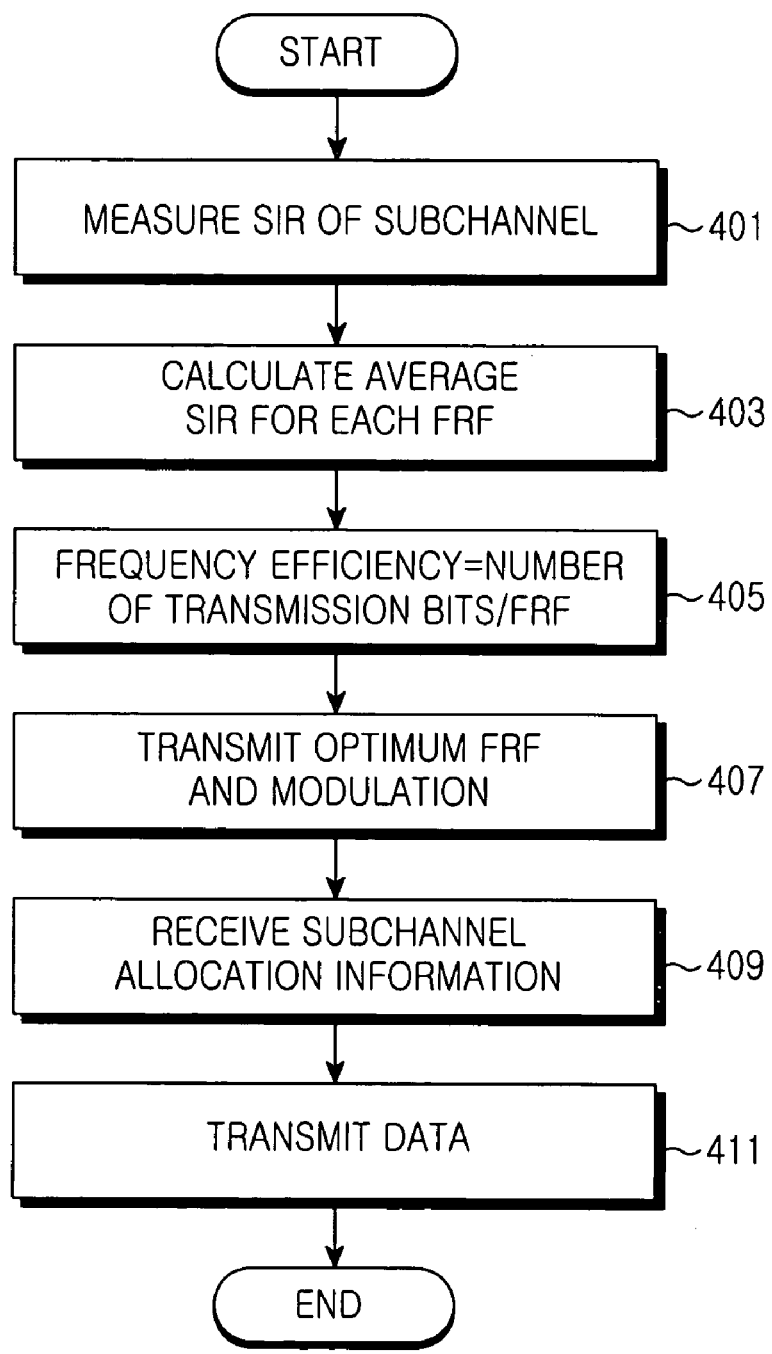
FIG. 4 is a flowchart illustrating an operation of an MS according to an embodiment of the present invention.

FIG. 4 is a flowchart illustrating the operation of the MS according to an embodiment of the present invention. Step 401 through step 405 correspond to step 301 of FIG. 3, step 407 corresponds to step 303, step 409 corresponds to step 315, and step 411 corresponds to step 317.

Referring to FIG. 4, the MS measures the signal to interference ratios (SIRS) of the signals received on the subchannels to calculate an optimum FRF in step 401 and calculates the average of the SIRs of the subchannels for each FRF in step 403. Assuming that three FRFs of 1, 3 and 7 are available, the MS calculates the average of the SIRs of the subchannels for FRF 1, an FRF of 3 (FRF 3), and an FRF of 7 (FRF 7), respectively. Aside from the SIR, any other parameter can be used as long as it represents the channel status of each subchannel.

The MS stores a table in which the SIRs are mapped to available modulation schemes. For example, for an SIR of 5 dB, QPSK is available. For an SIR of 7 dB, 16 QAM is available. When the channel environment is good and thus the SIR is high, a higher-order modulation scheme is available.

After determining an available modulation in relation to the SIR of each FRF, the MS obtains the optimum FRF having the highest efficiency using the FRFs and the modulations in step 405. The optimum FRF is calculated by $$\text{frequency efficiency} = \frac{\text{number of transmission bits}}{FRF} \quad (1)$$

If QPSK is available for FRF 1 and 16 QAM for FRF 3, the frequency efficiency values are 2 and 4/3. Hence, it is more efficient for the MS to use FRF 1.

In step 407, the MS transmits control information related to the optimum FRF and the available modulation scheme to the BS in step 407. In the above example, the control information is FRF=1 and QPSK.

The number of bits added to transmit the control information according to the embodiment of the present invention is calculated as follows. Assuming that M modulation schemes and K FRFs are available and the control information (i.e. the FRF and modulation information) is transmitted in BPSK, delivery of the control information requires $\log_2(KM)$ bits. When M=4 and K=2, 3 bits are required for the control information. Considering that control information bits are required for AMC even in a fixed FRF-cell environment, the amount of the added control information and an accompanying complexity are relatively very low in the present invention.

After the MS transmits to the BS the control information related to the optimum FRF and the modulation scheme, the BS and the RNC allocate the subchannels to the MS, as described with reference to FIG. 3. The MS receives the subchannel allocation information from the BS in step 409 and transmits data on the allocated subchannels in step 411.

Figure 5:
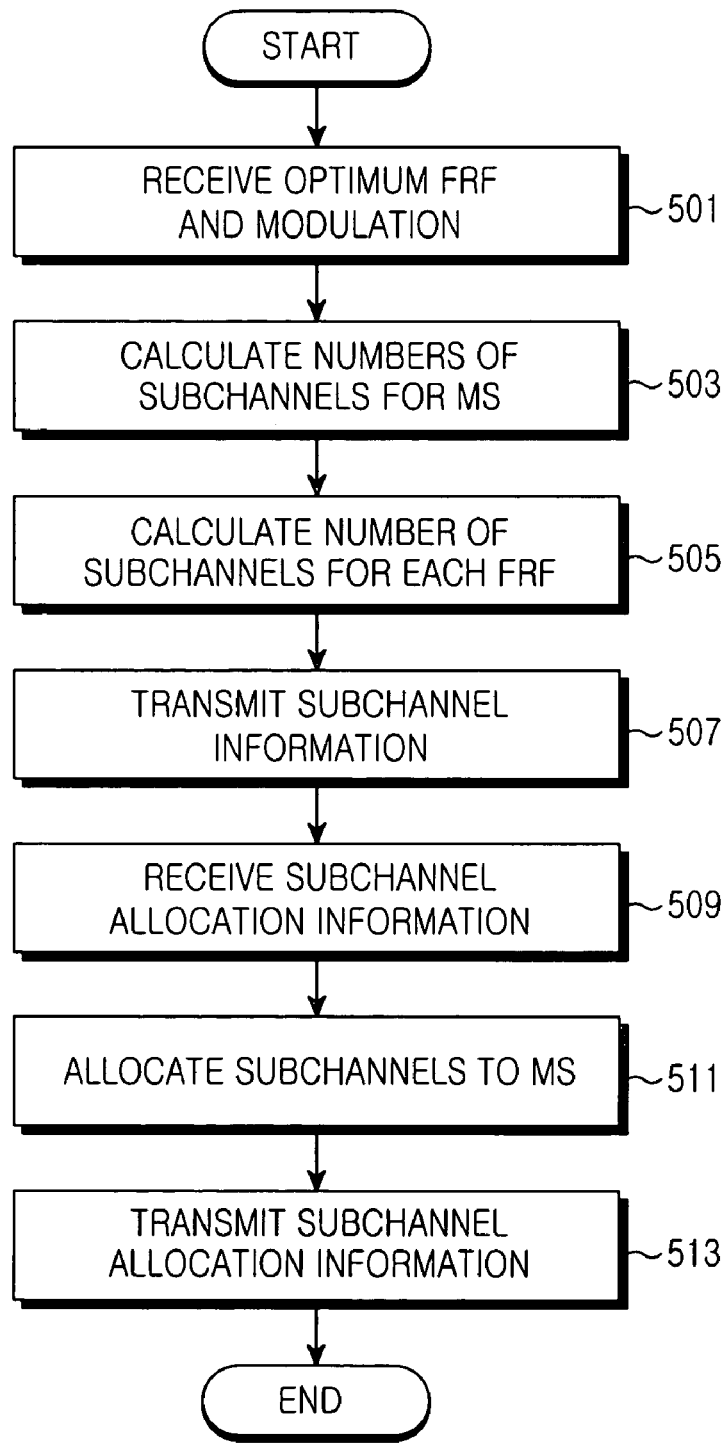
FIG. 5 is a flowchart illustrating an operation of a BS according to an embodiment of the present invention.

FIG. 5 is a flowchart illustrating the operation of the BS according to an embodiment of the present invention.

Referring to FIG. 5, upon receipt of the control information of an optimum FRF and a corresponding modulation scheme calculated according to the procedure of FIG. 4 from each MS in step 501, the BS calculates the number of subchannels for the MS based on the received information in step 503.

The number of subchannels needed for each MS is calculated by taking into account the control information received from the MS and a data rate requested by the MS. If the MS needs to transmit 10 bits and one subchannel delivers 2 bits in the modulation scheme, a total of 5 subchannels are required for the MS. Therefore, allocation of at least 5 subchannels to the MS satisfies its requested service.

After determining the number of subchannels for each MS, the BS calculates the number of subchannels for each FRF in step 505. Specifically, the number of subchannels is obtained by summing the numbers of subchannels required for the MSs for an FRF which is optimum for them.

In step 507, the BS reports the number of subchannels required for each FRF to the RNC. The RNC allocates subchannels for each FRF to each BS considering the reports received from BSs, which will be described later in detail.

Upon receipt of the information related to the subchannel allocation for each FRF from the RNC in step 509, the BS allocates the subchannels to each MS according to the subchannel allocation information in step 511 and transmits information related to the allocated subchannels to each MS in step 513.

Figure 6:
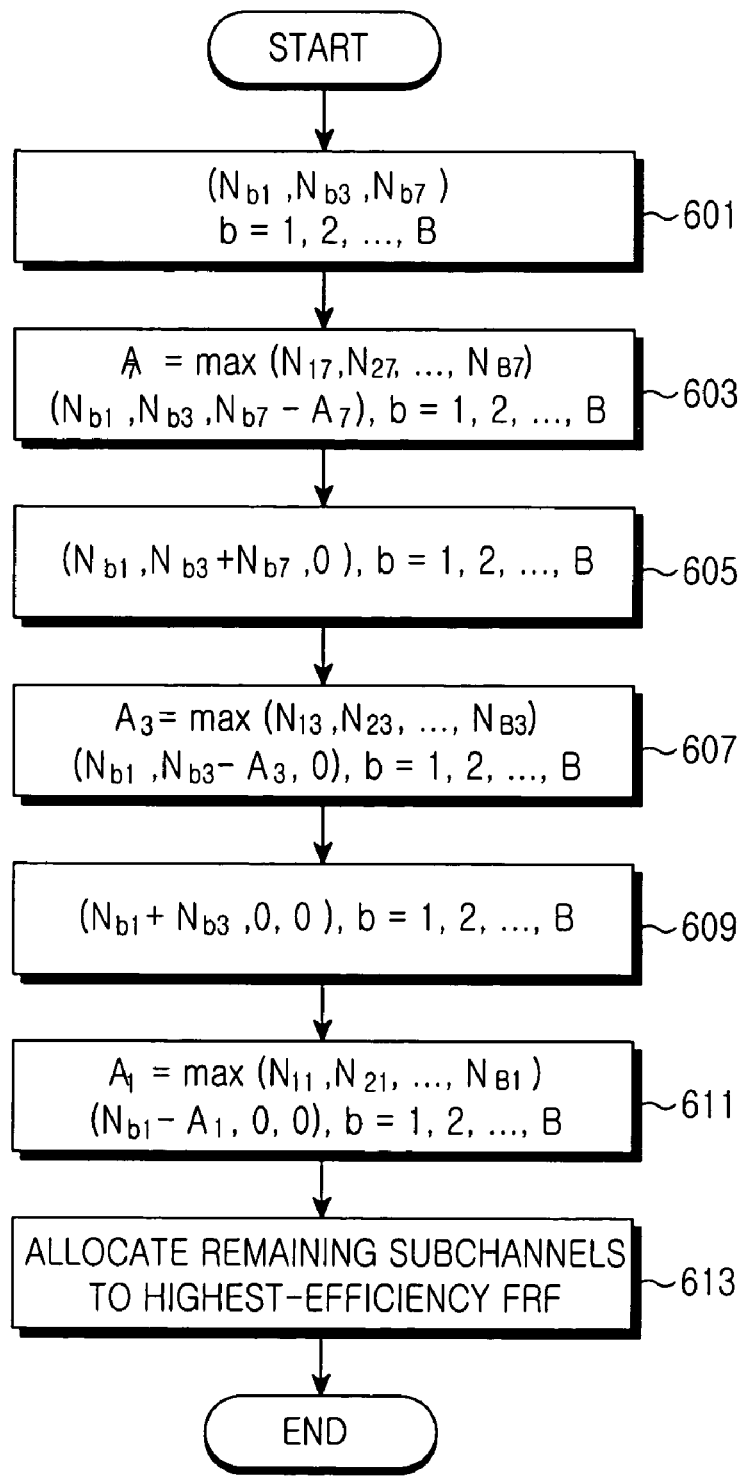
FIG. 6 is a flowchart illustrating an operation in a radio network controller (RNC) for allocating subchannels on a per-BS basis according to an embodiment of the present invention.

With reference to FIG. 6, a description will be made of a procedure for allocating subchannels for each FRF to each BS in the RNC.

FIG. 6 is a flowchart illustrating the subchannel allocation procedure to each BS in the RNC according to an embodiment of the present invention.

Referring to FIG. 6, the RNC allocates subchannels to each BS through cell coordination according to an embodiment of the present invention. For notational simplicity, it is assumed that the FRFs of 1, 3 and 7 are available and the numbers of subchannels required for the FRFs are $N_{b1}$, $N_{b3}$ and $N_{b7}$, respectively. Thus, the RNC receives information indicating $N_{b1}$, $N_{b3}$ and $N_{b7}$ for the respective FRFs from each BS in step 601. Here, b represents a cell, ranging from 1 to B. It is assumed that one RNC covers a total of B cells.

Typically, the values are different in the cells in a multi-cell environment. A cell configuration in which each cell has the same number of subchannels for each FRF is applied according to an embodiment of the present invention which is described later.

The highest FRF (FRF 7 herein) is first considered. In the case where an MS requests a low FRF but the subchannels are allocated to the MS with a high FRF, no problems occur because the interference is reduced. On the contrary, if the subchannels are allocated to an MS with a low FRF requesting a high FRF, interference from neighboring cells can be a problem. Therefore, to ensure channel allocation to MSs requesting a high FRF with priority, the highest FRF is considered. That is, considering the average channel performance, subchannels with a high FRF perform well instead of subchannels with a low FRF, but the reverse is not true.

Therefore, the RNC selects the maximum number of subchannels from among the subchannel numbers for FRF 7 requested by the BSs in step 603. Let the maximum subchannel number be denoted by A7. Then A7 is expressed as $$A_7 = \max(N_{17}, N_{27}, \ldots, N_{B7}) \quad (2)$$

A7 is subtracted from the subchannel numbers for FRF 7. As a result, as many subchannels as A7 are allocated to a cell requesting the A7 subchannels for FRF 7, but the difference of subtracting A7 from the subchannel numbers requested by the other cells except for the cell requesting the A7 subchannels is negative-signed. A number of subchannels equal to the difference are allocated to the other cells for FRF 3. Therefore, the number of the extra subchannels (i.e. the absolute value of the difference) is subtracted from the subchannel numbers that the other cells request for FRF 3 in step 605.

Thus, the subchannels as requested by each cell for FRF 7 are fully allocated to the cell. In the same manner, the subchannels are allocated to the cells for lower FRFs. For FRF 3, the subchannels are allocated first to a cell requesting the most subchannels. If the number of the most subchannels exceeds the numbers of subchannels that the other cells request for FRF 3, the excess subchannels are allocated for a lower FRF.

Therefore, the RNC selects the maximum number of subchannels from among the subchannel numbers for FRF 3 requested by the BSs in step 607. Let the maximum subchannel number be denoted by A3. Then A3 is expressed as $$A_3 = \max(N_{13}, N_{23}, \ldots, N_{B3}) \quad (3)$$

A3 is subtracted from the subchannel numbers for FRF 3. As a result, as many subchannels as A3 are allocated to a cell requesting the A3 subchannels for FRF 3, but the difference of subtracting A3 from the subchannel numbers requested by the other cells except for the cell requesting the A3 subchannels is negative-signed. A number of subchannels equal to the difference are allocated to the other cells for FRF 3. Therefore, the number of the extra subchannels (i.e. the absolute value of the difference) is subtracted from the subchannel numbers that the other cells request for FRF 1 in step 609.

Thus, the subchannels as requested by each cell for FRF 3 are fully allocated to the cell. In the same manner, the subchannels are allocated to the cells for FRF 1. For FRF 1, the subchannels are allocated first to a cell requesting the most subchannels. If the number of the most subchannels exceeds the number of subchannels that the other cells request for FRF 1, the excess subchannels are all allocated for an FRF having the highest frequency efficiency.

Therefore, the RNC selects the maximum number of subchannels from among the subchannel numbers for FRF 1 requested by the BSs in step 611. Let the maximum subchannel number be denoted by A1. Then A1 is expressed as $$A_1 = \max(N_{11}, N_{21}, \ldots, N_{B1}) \quad (4)$$

A1 is subtracted from the number of subchannels for FRF 1. As a result, A1 subchannels are allocated to a cell requesting the A1 subchannels for FRF 1. However, the difference of subtracting A1 from the number of subchannel requested by the other cells except for the cell requesting the A1 subchannels is negative-signed. That is, the excess subchannels are allocated for an FRF having the highest frequency efficiency in step 613. In the above example, the highest frequency efficiency is achieved when the FRF is 1. Hence, preferably the excess channels are all allocated for FRF 1.

While the embodiment of the present invention has been described for FRFs of 1, 3 and 7, it is clear that the subchannel allocation method is also applicable to a cellular system using different FRFs in the same manner.

For a better understanding of the present invention, the method of allocating subchannels on a per-BS basis will be described by way of example of two cells requesting subchannels for respective FRFs illustrated in Table 1 below.

TABLE 1

| step | $(N_{11}, N_{13}, N_{17})$ | $(N_{21}, N_{23}, N_{27})$ | |
|------|---------------------------|---------------------------|---|
| 1 | (10, 10, 10) | (5, 5, 20) | $A_7 = \max(5, 20) = 20$ |
| 2 | (10, 10, −10) | (5, 5, 0) | |
| 3 | (10, 0, 0) | (5, 5, 0) | $A_3 = \max(0, 5) = 5$ |
| 4 | (10, −5, 0) | (5, 0, 0) | |
| 5 | (5, 0, 0) | (5, 0, 0) | $A_1 = \max(5, 0) = 5$ |
| 6 | (0, 0, 0) | (0, 0, 0) | |
| 7 | 512 − 5 − 15 − 140 = 352 | (357, 5, 20) | |

Referring to Table 1, BS 1 (b=1) needs 10 subchannels for FRF 1, 10 subchannels for FRF 3, and 10 subchannels for FRF 7. That is, $(N_{11}, N_{13}, N_{17})$=(10, 10, 10). BS 2 (b=2) needs 5 subchannels for FRF 1, 5 subchannels for FRF 3, and 20 subchannels for FRF 7. That is, $(N_{21}, N_{23}, N_{27})$=(5, 5, 20).

Regarding FRF 7, BS 1 and BS 2 request 10 and 20 subchannels, respectively. Therefore, A7 is 20. In step 2, 20 is subtracted from 10 and 20, respectively, resulting in −10 for BS 1 and 0 for BS 2. Since the subchannels are allocated first with respect to BS 2 for FRF 7, there are 10 excess subchannels (i.e. −10) for BS 1. Then, the requested 10 subchannels are allocated to BS 1 and the 10 excess subchannels are allocated to BS 1 for a one level-lower FRF, that is, FRF 3.

In step 3, therefore, $(N_{11}, N_{13}, N_{17})$=(10, 0, 0) and $(N_{21}, N_{23}, N_{27})$=(5, 5, 0). Consequently, 20 subchannels are all allocated to BS 2 for FRF 7, and 10 subchannels are allocated for FRF 7 and 10 subchannels for FRF 3 to BS 1.

Now, BS 1 and BS 2 need no subchannels and 5 subchannels, respectively for a FRF of 3. Thus, A3 is 5. In step 4, 5 is subtracted from 0 and 5, respectively, resulting in −5 for BS 1 and 0 for BS 2. Since subchannels are allocated first with reference to BS 2 for FRF 3, there are 5 excess subchannels (i.e. −5) for BS 1. The 5 excess subchannels are allocated to BS 1 for a one level-lower FRF, that is, FRF 1.

In step 5, therefore, $(N_{11}, N_{13}, N_{17})$=(5, 0, 0) and $(N_{21}, N_{23}, N_{27})$=(5, 0, 0). Consequently, 5 subchannels are all allocated to BS 2 for FRF 3, and no subchannels are allocated for FRF 3 and 5 subchannels for FRF 1 to BS 1.

Now, BS 1 and BS 2 each need 5 subchannels for a FRF of 1. Thus, A1 is 5. In step 6, 5 is subtracted from 5 and 5, respectively, resulting in 0 for BS 1 and 0 for BS 2.

Meanwhile, in the case where the point size of IFFT and FFT is 512 and thus a total of 512 subchannels are available, the number of the subchannels allocated in the procedure of Table 1 is 352 (=512−5−15−140). That is, the 5 subchannels allocated for FRF 1 are all reused in a cluster of 7 cells. The 5 subchannels allocated for FRF 3 are reused in one cell out of every 3 cells. The 20 subchannels allocated for FRF 7 are reused in one cell out of every 7 cells. Hence, the number of subchannels to be allocated to each cell must be calculated by giving a weighting value of 3 to FRF 3 and a weighting value of 7 to FRF 7.

Therefore, 352 subchannels remain from the subchannel allocation from among the total of 512 subchannels. As described before, the 352 subchannels are allocated for FRF 1 showing the highest frequency use efficiency. Finally, the number of subchannels allocated to each cell are 357, 5, and 7 for FRF 1, FRF 3 and FRF 7, respectively. That is, (357, 5, 20).

Information related to the finally allocated subchannels for each FRF is transmitted to each BS. Let the total number of subchannels be denoted by N. Then, the maximum number of bits required from the BS to the RNC is calculated by $$\text{maximum bit number} = \log_2 N + \log_2 \frac{N}{3} + \log_2 \frac{N}{7} \quad (5)$$

According to Equation (5), the maximum bit number is 24 for N=512. Considering the BS is connected to the RNC generally by an optical fiber, the amount of the information is negligibly small.

When the number of subchannels is determined for each FRF in the above-described method, the RNC determines what subchannels to allocate to which BSs for which FRF. It can be done in many ways. However, it is preferable to determine the positions of the allocated subchannels so that they are spaced as far apart as possible for each BS and for each FRF.

On the assumption that 4 subchannels are allocated for FRF 1, and 2 subchannels for FRF 3 to each BS, the subchannels are allocated not successively but in a randomized order. The resulting increase of spacing between subchannels allocated to each BS leads to frequency-domain diversity. If the sequence of the subchannels is randomized in the order of 4, 9, 1, 6, 3, 10, 2, 8, 5, 7, subchannels 4, 9, 1, 6 are allocated for FRF 1 and subchannels 10 and 2 for FRF 3 to BS 1, as illustrated in Table 2 below.

TABLE 2

|  | Subchannels with FRF 1 | Subchannels with FRF 3 |
|---|---|---|
| Before randomization | 1, 2, 3, 4 | 5, 6/7, 8/9, 10 |
| After randomization | 4, 9, 1, 6 | 3, 10/2, 8/5, 7 |

The subchannel allocation in the above-described manner eventually brings diversity in allocating subchannels to MSs.

The method of determining the number and positions of subchannels to be allocated to each BS for each FRF in the RNC has been described. Finally, a method of allocating subchannels to each MS according to the information related to the subchannels allocated to each BS for each FRF will be described with reference to FIG. 7.

Figure 7:
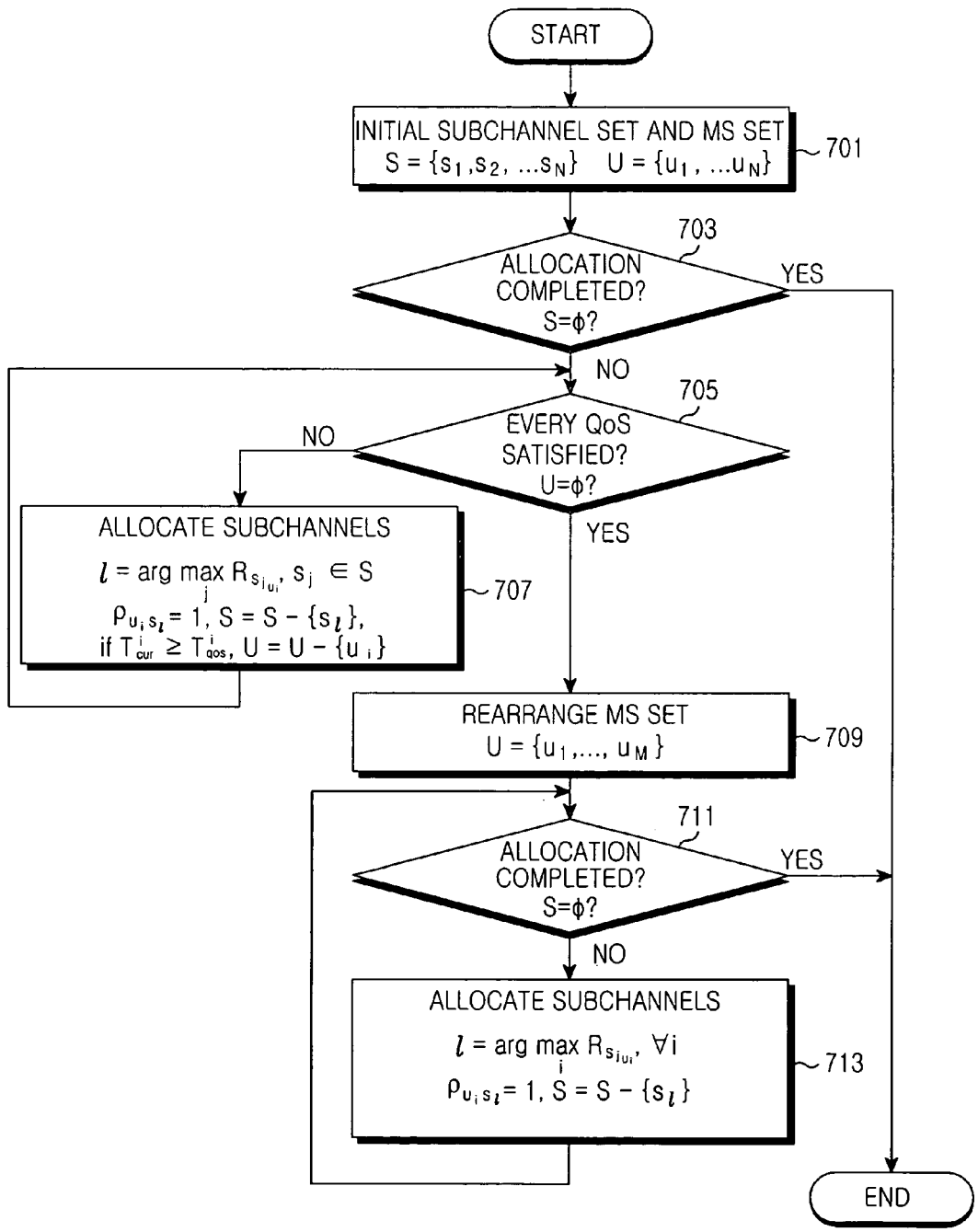
FIG. 7 is a flowchart illustrating an operation in the BS for allocating subchannels on a per-MS basis according to an embodiment of the present invention.

FIG. 7 is a flowchart illustrating a procedure for allocating subchannels to each MS in the BS according to an embodiment of the present invention.

Referring to FIG. 7, upon receipt of the information related to the subchannels allocated for each FRF from the RNC, the BS initializes a subchannel set, S and an MS set, U by Equation (6) and Equation (7), respectively, in step 701.

$$S = \{s_1, s_2, \ldots, s_N\} \quad (6)$$

where N denotes the number of subchannels, s allocated to a BS b.

$$U = \{u_1, u_2, \ldots, u_M\} \quad (7)$$

where M denotes the number of MSs in the BS.

If S is an empty set, that is, if there are no subchannels to be allocated in step 703, the subchannel allocation procedure is terminated. In the presence of subchannels to be allocated, the procedure goes to step 705.

When there are MSs of which the quality of services (QoSs) are not satisfied, that is, all requested subchannels are not allocated to the MSs in step 705, available subchannels are allocated to the MSs according to the status of their channel in step 707.

In steps 705 and 707, the subchannels having good channel characteristics are selected for the MSs in a predetermined order until their QoSs are satisfied. A higher priority is given to a user requiring subchannels with a high FRF. This is done in order to utilize the varying channel characteristics of each subchannel, while allocating subchannels with a high FRF to users.

It is assumed here that $N_1^{11}=1$, $N_1^{12}=3$, and $N_3^{13}=2$, and subchannels are allocated to each BS in a randomized order as illustrated in Table 2. The first superscript of N denotes a BS and the last super script thereof denotes an MS. The subscript of N denotes an FRF. Thus, MS 3 needs 2 subchannels with FRF 3, MS 1 needs one subchannel with FRF 1, and MS 2 needs 3 subchannels with FRF 1. The numbers of subchannels that the MSs require are calculated based on an average link performance. Yet, it is preferable to achieve the values using varying channel values under a real fading channel environment.

The problem encountered with using the average link performance can be solved by allocating subchannels first to MS 3. Since subchannels 3 and 10 are used for FRF 3 in Table 2, their probability of good signal performance is higher than that of subchannels 4, 9, 1 and 6 used for FRF 1 at a receiver. Yet, any of the subchannels 4, 9, 1 and 6 performs better than the subchannels 3 and 10, the subchannel having the better performance is allocated to the MS irrespective of their FRF. In this way, the subchannels with a high FRF can be allocated to the other MSs. Thus, any loss involved in utilizing the average performance can be compensated for to some extent.

The channel status-based subchannel allocation method can be implemented by $$l = \arg\max\,_j R_{s_{j u_i}},\, s_j \in S \quad (8)$$

$$\rho_{u_i s_l} = 1,\, S = S - \{s_l\},$$

$$\text{if } T_{cur}^i \geq T_{qos}^i,\, U = U - \{u_i\}$$

where $T_{cur}^i$ is the number of transmission bits of user i at a subchannel allocation time, and $T_{qos}^i$ is the number of transmission bits that user i requests.

According to Equation (8), the subchannel that provides the highest data rate (i.e. the subchannel in the best channel status) to an MS, $u_i$ from among all subchannels $s_j$, is first allocated to the MS. ρ is set to 1 when a subchannel $s_j$ has been allocated to the MS $u_i$. Then, the allocated subchannel and the MS element are excluded from the subchannel set U and the MS set S, respectively.

When all of the MS-requested subchannels are allocated to the MSs and thus the MS set U is empty in step 705, the MS set U is rearranged with respect to all of the MSs in step 709. That is, unallocated remaining subchannels are allocated to all of the MSs.

If all of the requested subchannels are allocated to the MSs and there remain no available subchannels in step 711, the subchannel allocation procedure is terminated. On the contrary, if available subchannels remain, the subchannels are allocated according to their channel statuses in step 713, in the same manner as in step 707.

This subchannel allocation is done by $$l = \arg\max\,_j R_{u_i},\, \forall_i$$

$$\rho_{u_i s_l} = 1,\, S = S - \{s_l\} \quad (9)$$

Since the remaining subchannels are allocated to every MS according to Equation (9), there is no need for the comparison included in Equation (8). While a subchannel having the highest data rate is selected by comparing available subchannels in allocating a requested subchannel to an MS in Equation (8), an MS having the highest data rate is selected to receive a remaining subchannel by comparing the data rates of all MSs in Equation (9).

Figure 8:
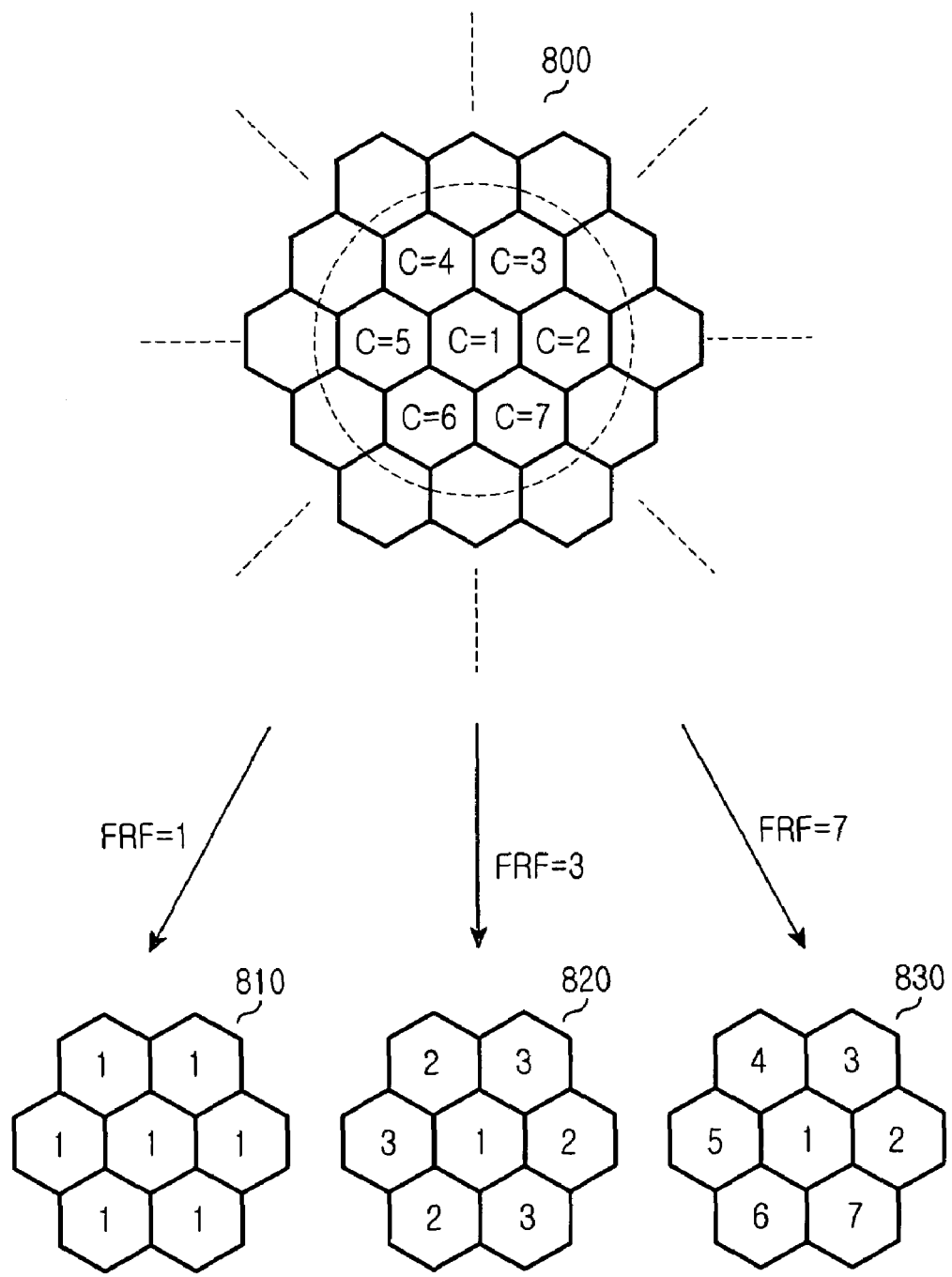
FIG. 8 is a view illustrating subchannel allocation to cells according to their frequency reuse factors according to an embodiment of the present invention.

FIG. 8 illustrates subchannel allocation in each cell according to FRFs according to an embodiment of the present invention.

Referring to FIG. 8, subchannels are allocated to 7 cells 800, C=1 to C=7. Subchannels allocated for FRF 1 are reused in all 7 cells, as indicated by reference numeral 810. The subchannels allocated for FRF 3 are divided among 3 cells, as indicated by reference numeral 820 and the subchannels allocated for FRF 7 are divided among 7 cells, as indicated by reference numeral 830.

For example, if the subchannels are allocated to the 7 cells according to the subchannels numbers illustrated in Table 1, 357 subchannels allocated for FRF 1 are used in each of the 7 cells. For FRF 3, 5 subchannels are allocated to C=1, another 5 subchannels are allocated to each of C=3, C=5 and C=7, and a third group of 5 subchannels are allocated to each of C=2, C=4 and C=6. For FRF 7, 20 subchannels are allocated to C=1, and a different set of 20 subchannels is allocated to each of C=2 to C=7. Consequently, each cell has 357 subchannels for FRF 1, 5 subchannels for FRF 3, and 20 subchannels for FRF 7.

More specifically, with no consideration given to the randomization in allocating subchannels to each cell for conciseness, the cells illustrated in FIG. 8 are allocated to the subchannels as illustrated in Table 3.

TABLE 3

| Cell index (C) | Subchannel index | | |
| --- | --- | --- | --- |
| | FRF = 1 (357) | FRF = 3 (5) | FRF = 7 (20) |
| 1 | 1-357 | 358-362 | 373-392 |
| 2 | 1-357 | 363-367 | 393-412 |
| 3 | 1-357 | 368-372 | 413-432 |
| 4 | 1-357 | 363-367 | 433-452 |
| 5 | 1-357 | 368-372 | 453-472 |
| 6 | 1-357 | 363-367 | 473-492 |
| 7 | 1-357 | 368-372 | 483-512 |

For notational simplicity, randomized allocation of subchannels for frequency-domain diversity is not considered in Table 3. Yet, it is preferable to allocate the subchannels in such a manner that randomizes their indexes in the actual implementation. One thing to note regarding the randomized allocation is that the same subchannels must be allocated to cells having the same subchannel indexes as in Table 3.

The FRF-based subchannel allocation according to the embodiment of the present invention has been described above in detail. Now a description will be made of a BS apparatus and an MS device according to the embodiment of the present invention with reference to FIGS. 9 and 10.

Figure 9:
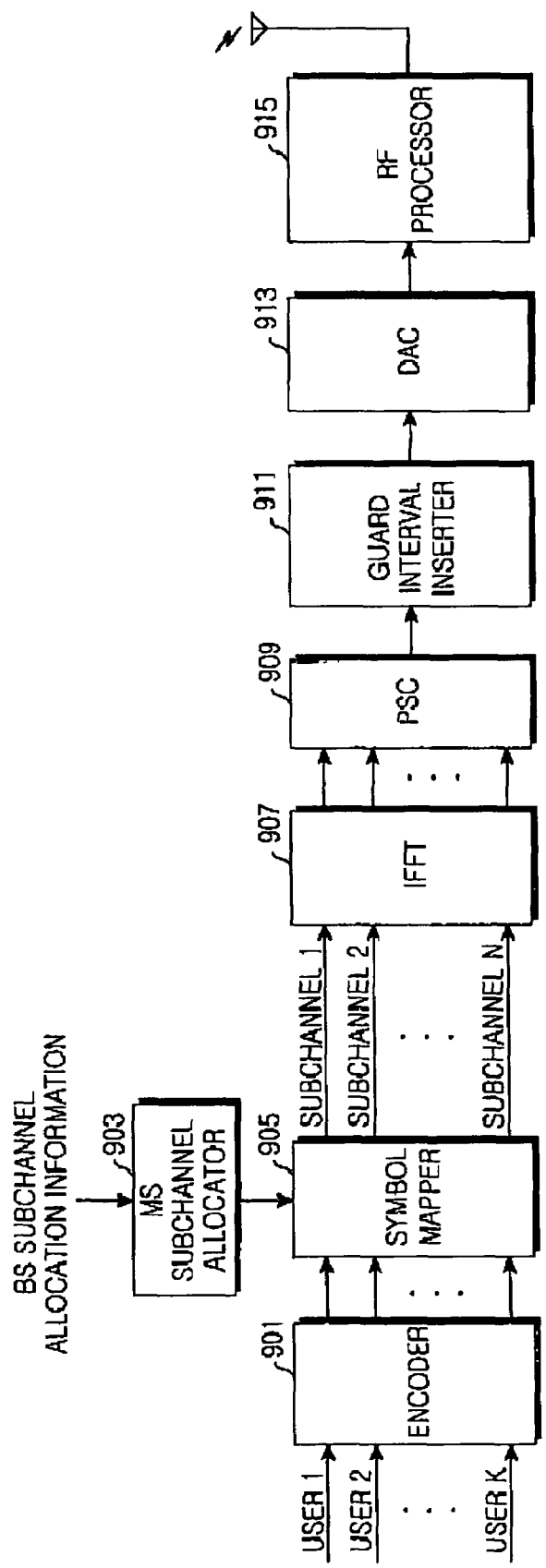
FIG. 9 is a block diagram of a transmitter in the BS according to an embodiment of the present invention.

FIG. 9 is a block diagram of a transmitter in the BS according to an embodiment of the present invention.

Referring to FIG. 9, after being processed in an encoder 901, data to be transmitted to K MSs are mapped to the input points of an IFFT 907 based on the subchannel allocation information by an MS subchannel allocator 903 and a subchannel mapper 905 according to the embodiment of the present invention. The data are IFFT-processed in the IFFT 907. The IFFT signals are processed in a PSC 909, a guard interval inserter 911, a DAC 913, and an RF processor 915. The processed signals are then transmitted to the K users.

The configurations of the PSC 909, the guard interval inserter 911, the DAC 913, and the RF processor 915 are well know in the art, and their description is not provided.

The subchannel allocation algorithm of the present invention is added to a typical OFDMA system configuration. That is, the BS reports to the RNC the number of subchannels required for each FRF as determined based on information related to an optimum FRF and a modulation scheme received from each MS and receives the information related to the number of subchannels to be allocated for each FRF from the RNC according to the embodiment of the present invention. The MS subchannel allocator 903 allocates the subchannels to each MS based on the subchannel allocation information in the procedure illustrated in FIG. 7. The subchannel mapper 905, which receives the information related to the subchannel allocation to each MS from the MS subchannel allocator 903, maps data to the subchannels for each MS according to the MS subchannel allocation information.

Meanwhile, one subchannel is composed of one or more subcarriers, as described before. One or more subchannels can be mapped to one MS. For example, data for MS 1 can be mapped to subchannels 1 and 3, and data for MS 2 can be mapped to subchannels 2, 6 and 7. As described earlier, the mapping is performed corresponding to the subchannel allocation of the MS subchannel allocator 903.

Information related to the subchannels allocated to each MS is transmitted to the MS so that the MS can demodulate only its data according to the subchannel allocation information. The subchannel allocation information is transmitted as control information on an additional subchannel, or on a broadcast channel such as UL-MAP common to all of the MSs.

Figure 10:
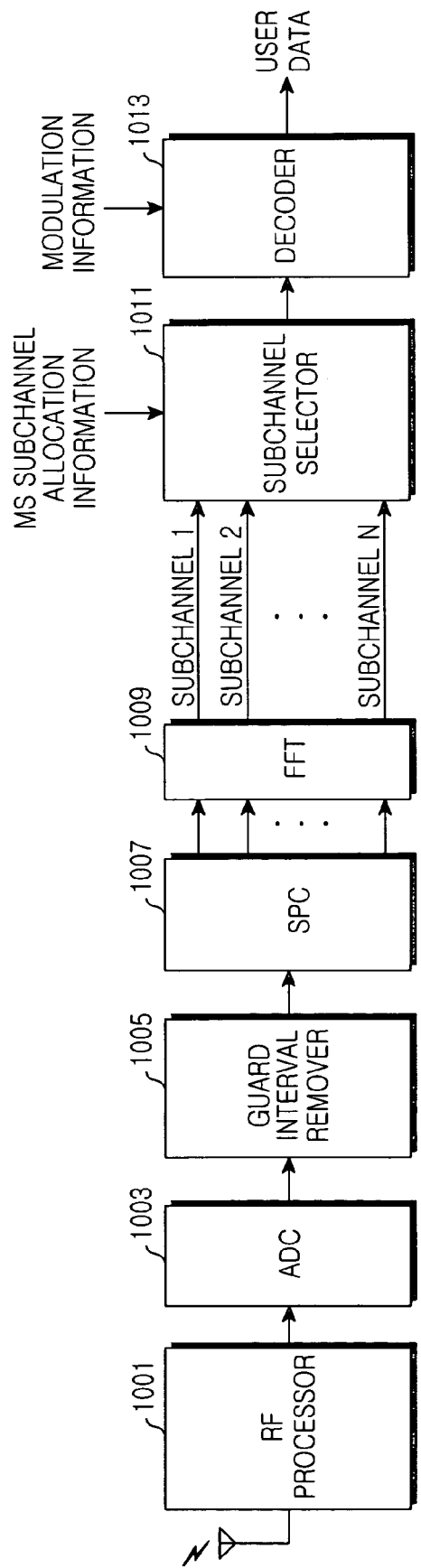
FIG. 10 is a block diagram of a receiver in the MS according to an embodiment of the present invention.

With reference to FIG. 10, a method of receiving data from the BS transmitter illustrated in FIG. 9 in a receiver of the MS will be described below.

FIG. 10 is a block diagram of the MS receiver according to an embodiment of the present invention.

Referring to FIG. 10, data transmitted from the transmitter illustrated in FIG. 9 is received at an Rx antenna in the receiver. The data is divided into a plurality of (e.g. N) subchannel signals through processing in an RF processor 1001, an ADC 1003, a guard interval remover 1005, a SPC 1007, and an IFFT 1009. The RF processor 1001, the ADC 1003, the guard interval remover 1005, the SPC 1007, and the IFFT 1009 operate in the manner described before, thus, their description is not provided here.

According to the present invention, a subchannel selector 1011 selects subchannels allocated to the MS among the plurality of subchannel signals from the IFFT 1009 according to the subchannel allocation information received from the transmitter. A decoder 1013 decodes the selected subchannel signals in correspondence with an encoding method used in the encoder 901 of the transmitter.

The subchannel allocation information as provided to the subchannel selector 1011 describes the subchannels allocated based on the channel and FRF information of MSs, received from the BS. The subchannel allocation information is preferably received at every predetermined subchannel allocation period, T. Alternatively, it can be received each time the subchannel allocation information is changed.

The apparatus and method for allocating subchannels according to the embodiment of the present invention have been described. The present invention will now be compared with the conventional technology in terms of performance with reference to FIG. 11.

Figure 11:
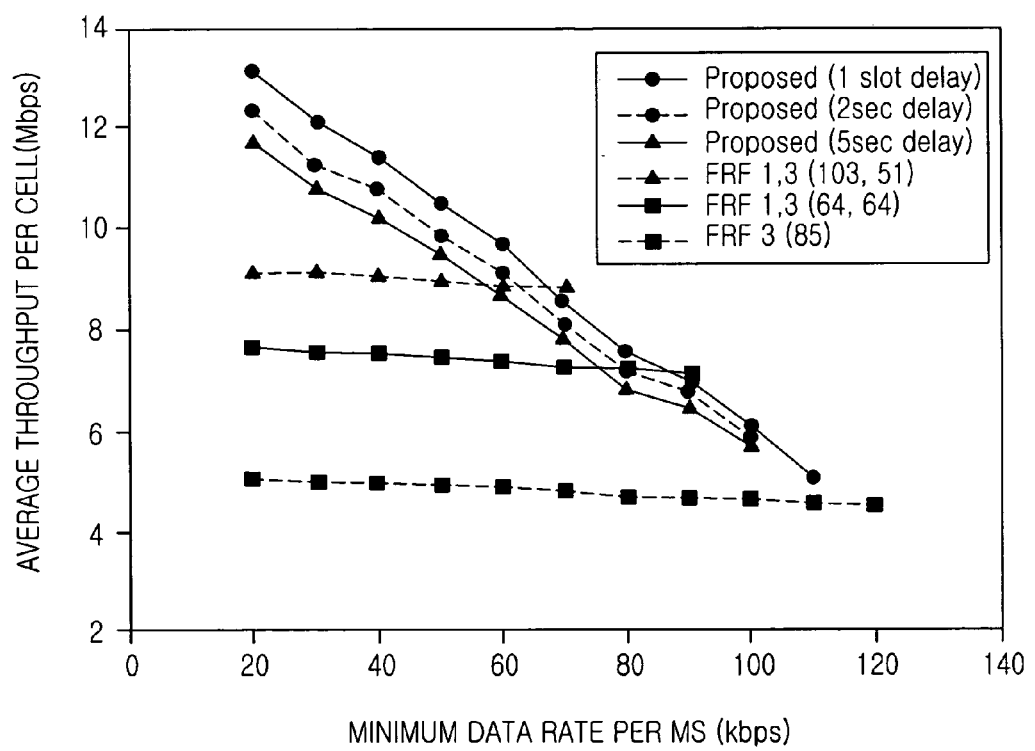
FIG. 11 is a graph comparing an embodiment of the present invention with a conventional subchannel allocation method in terms of performance.

FIG. 11 is a graph comparing the present invention with the conventional technology in terms of performance.

To analyze the performances of the adaptive FRF method according to the present invention and conventional methods, a simulation was performed under the conditions illustrated in Table 4.

TABLE 4

| | |
|---|---|
| Number of subcarriers | 512 |
| Carrier freq. | 2 GHz |
| BW | 10 MHz |
| Number of BS | 37 |
| Channel Model | Vehicular/Ch. A |
| Radius | 1 km |
| Propagation Model | Path Loss: Dr (r = −3.5) |
| Number of users | 30 |
| User Mobility | v(n) = v(n − 1) + Uniform (−10, 10) kmh, (n: time index) v(n)min = 0, v(n)max = 100 kmh |
| Processing delay | 0/2000 slots (1 slot: 1 msec) |
| Modulation Scheme | Adaptive: BPSK, QPSK, 16 QAM, 64 QAM |
| Shadow fading | Correlated model (std: 10 dB, $d_{corr}$: 20 m) |

The simulation was based on the assumption that the same power is allocated to every subchannel, a total of 512 subchannels are available, FRF 1 and FRF 3 are available, 30 users are equally distributed within each cell, and mobile velocity has a uniform distribution between 0 to 100 km/h. Also, it was assumed that a minimum data rate is ensured for every user, all measurements are accurate, and AMC is performed every 1 msec.

FIG. 11 illustrates an average throughput per cell with respect to a minimum required data rate from each user. The present invention was analyzed with respect to an algorithm time delay (time from MS measuring and reporting to subchannel allocation to BS) being 1 slot equal to the AMC period, 2 seconds, and 5 seconds. The present invention was compared with the conventional methods in which both FRF 1 and FRF 3 are applied using 128 subchannels and the subchannels are allocated only with FRF 3.

Referring to FIG. 11, it is noted that as the number of user-requested transmission bits decreases, the number of extra subchannels for FRF 1 increases. The proposed methods adaptively allocate more subchannels for FRF 1, thereby increasing system throughput. Meanwhile, the 2-second delay does not lead to a significant performance degradation compared to the 5-second delay because the average link performance is not changed much within a range of 5 seconds. On the other hand, the increase of the user-requested transmission bit number decreases the system throughput and limits the number transmission bits ensured for every user. This is explained by the fact that the number of subchannels used to ensure user-requested transmission bits for users at a cell boundary increases and extra subchannels available to increase frequency efficiency decrease in number, thereby making it impossible to provide a service with a given bandwidth. Hence, it is concluded that a maximum bit number that can be ensured for every user in the proposed methods is far greater than that in the fixed FRF method.

In accordance with the present invention as described above, subchannels are efficiently allocated according to FRFs in an AMC system, thereby increasing system performance. Also, different FRFs are set for a cell, taking into account the amount of transmitted data between the cells and their channel statuses. Consequently, a more efficient subchannel allocation is possible.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of allocating one or more subchannels to one or more mobile stations (MSs) in an orthogonal frequency division multiple access (OFDMA) mobile communication system in which a first base station (BS) communicates with a plurality of MSs within a cell area of the BS and a radio network controller (RNC) controls radio resources for a plurality of BSs including the first BS, the method comprising the steps of:
   receiving from the plurality of MSs information related to an optimum frequency reuse factor (FRF) and a modulation scheme;
   calculating the number of subchannels required for each FRF according to the received information;
   allocating subchannels to the first BS for each FRF, based on the calculated subchannel numbers from the first BS and neighboring BSs; and
   allocating the allocated subchannels to the MSs.

2. The method of claim 1, wherein the optimum FRF is determined according to signal to interference ratios (SIRs) of signals with different FRFs.

3. The method of claim 1, wherein the optimum FRF is determined according to modulation schemes available with respect to signal to interference ratios (SIRs) of signals with different FRFs.

4. The method of claim 1, wherein the calculation step comprises the step of calculating the number of subchannels required for each FRF according to the number of information bits requested by the MSs and modulation schemes available to the MSs.

5. The method of claim 1, wherein the step of allocating subchannels to the BS for each FRF comprises the step of allocating the subchannels in an order of the highest FRF to the lowest FRF.

6. The method of claim 1, wherein the step of allocating subchannels to the first BS for each FRF comprises the step of allocating subchannels to the first BS for each FRF according to a maximum subchannel number requested for the same FRF, taking into account the number of subchannels requested by the neighboring BSs for each FRF.

7. The method of claim 1, wherein the step of allocating the allocated subchannels to the MSs comprises the step of allocating the subchannels to MSs having good channel characteristics for the subchannels with priority.

8. An apparatus for allocating one or more subchannels to one or more mobile stations (MSs) in an orthogonal frequency division multiple access (OFDMA) mobile communication system in which a first base station (BS) communicates with a plurality of MSs within a cell area of the BS and a radio network controller (RNC) controls radio resources for a plurality of BSs including the first BS, the apparatus comprising:
   a BS subchannel allocator for receiving from the plurality of MSs information related to an optimum frequency reuse factor (FRF) and a modulation scheme, calculating the number of subchannels required for each FRF according to the received information, and allocating subchannels to the first BS for each FRF, based on the calculated subchannel numbers from the first BS and neighboring BSs; and
   an MS subchannel allocator for allocating the allocated subchannels to the MSs.

9. The apparatus of claim 8, wherein the BS subchannel allocator is provided in the RNC.

10. The apparatus of claim 8, wherein the MS subchannel allocator is provided in the BS.

11. The apparatus of claim 8, wherein the optimum FRF is determined according to signal to interference ratios (SIRs) of signals with different FRFs.

12. The apparatus of claim 8, wherein the optimum FRF is determined according to modulation schemes available with respect to signal to interference ratios (SIRs) of signals with different FRFs.

13. The apparatus of claim 8, wherein the BS subchannel allocator calculates the number of subchannels required for each FRF based on the number of information bits requested by the MSs and modulation schemes available to the MSs.

14. The apparatus of claim 8, wherein the BS subchannel allocator allocates subchannels on a per-FRF basis to the first BS in an order of the highest FRF to the lowest FRF.

15. The apparatus of claim 8, wherein the BS subchannel allocator allocates subchannels to the first BS for each FRF according to a maximum subchannel number requested for the same FRF, taking into account the numbers of subchannels requested by the neighboring BSs for each FRF.

16. The apparatus of claim 8, wherein the MS subchannel allocator allocates the subchannels to MSs having good channel characteristics for the subchannels with priority.

* * * * *